United States Patent [19]
Hashi et al.

[11] Patent Number: 4,513,063
[45] Date of Patent: Apr. 23, 1985

[54] COATED RUBBER CORD

[76] Inventors: Takahiro Hashi; Saeko Hashi, both of 1-1-9, Kasuya, Setagaya-ku, Tokyo, Japan, 105

[21] Appl. No.: 456,496

[22] Filed: Jan. 7, 1983

[30] Foreign Application Priority Data

Oct. 16, 1982 [JP] Japan .................................. 57-181933

[51] Int. Cl.³ ........................ B32B 15/00; D02G 3/00; D04C 1/02; D04C 1/00
[52] U.S. Cl. ..................................... 428/377; 428/375; 87/2; 87/6
[58] Field of Search ............... 428/364, 365, 377, 375; 87/2, 6

[56] References Cited

U.S. PATENT DOCUMENTS

| 2,262,861 | 11/1941 | Pugeley et al. | 428/365 |
| 2,948,182 | 8/1960 | Huppertsberg | 87/2 |
| 3,014,087 | 12/1961 | Kaplan | 87/2 |
| 3,130,630 | 4/1964 | Dawes | 87/2 |

Primary Examiner—George F. Lesmes
Assistant Examiner—Beverly K. Johnson
Attorney, Agent, or Firm—McCormick, Paulding & Huber

[57] ABSTRACT

A coated rubber cord comprising a core member coated with a woven cover material in the texture of which a single or a plurality of rubber strings are mixedly woven.

13 Claims, 3 Drawing Figures

COATED RUBBER CORD

BACKGROUND OF THE INVENTION

The invention relates to a coated rubber cord of a novel structure. The coated rubber cord in this specification means a cord having a core member which consists of a single or a bunch of natural and/or artificial rubber lines and a woven cover material coating the core member. The woven cover material is made of threads woven into a tubular form and can be elongated or allowed to contract together with the core member. However, the length by which the woven cover material can be extended is shorter than the length by which the core member can be elongated. Such rubber cords have been used for various purposes. They are used, for example, in trampolines, cords for tying luggage to the luggage-carrier of a bicycle, etc., or in the core member of the cords of the expander as disclosed in the Japanese Utility Model Application No. 52019/1976 (Laid-Open No. 144052/1977) by the applicant of the present application. It is advantageous to coat the core member with such a cover material extensible at a smaller rate than the core member in that the woven cover material serves as a protective layer against the possible damages caused from the outside and that, since the core member is prevented from being elongated by a longer length than that by which the cover material can be elongated, fatigue does not accumulate in the core member, thus increasing the resistivity against weather and endurance in use of the rubber cord. However, conventional rubber cords with such advantages also had disadvantages. Specifically, while the core member grows much slender as the rubber cord is elongated, the woven cover material does not likewise grow slimmer, thereby developing a gap between the core member and the woven cover material. The gap created is greatest when the rubber cord is elongated by the length three to four times as long as its normal length. Such a gap makes the woven cover material liable to change its location with respect to the core member and where, in particular, the rubber cord receives outer forces such as those in the case of said expander, for example, applied to the rubber cord each time it contacts the surrounding tubular member, unevenness is developed in the texture of the woven cover material as the rubber cord is elongated and allowed to contract repeatedly. Such nonuniformity in the texture of the woven cover material, once developed, grows more and more important and does not recover. The loosened texture portions can only be extended by a shorter length than they originally could whereas the tightened texture portions can be elongated by a longer length than they initially could. Therefore, if the rubber cord is elongated and allowed to contract repeatedly, leaving the uneven texture as it is, only those parts of the core member as enveloped by the loosened texture portions of the woven cover material are repeatedly elongated by a longer length than they should be. Fatigue therefore accumulates in such overly elongated parts of the core member, resulting in too early breach or snapping of the rubber cord. Thus the coating of conventional woven cover material rather reduced the endurance of the rubber cords as compared with noncoated rubber cords.

SUMMARY OF THE INVENTION

It is an object of the present invention to completely eliminate the above-mentioned drawbacks of the conventional coated rubber cords and provide a coated rubber cord with an excellent endurance.

The coated rubber cord according to the invention is characterized in that its core member is coated with a woven cover material in the texture of which a rubber string or strings are mixedly woven.

The core member of the rubber cord according to the invention may either consist of a single or a bunch of a plurality of natural or artificial rubber lines.

The rubber string or strings mixedly woven in the cover material may be either natural or artificial rubber strings and may be uncovered rubber strings or, alternatively, rubber strings round which threads or fibers are wound (hereinafter referred to as covered rubber strings). The rubber string or strings may be woven in the texture of the cover material so as to be substituted for one or more of the threads forming the woven cover material or, alternatively, additionally woven into the integral texture of the woven cover material.

Normally one or at most two rubber strings are sufficient. Where the rubber cords are of a considerable thickness, more than two rubber strings may of course be used.

In cases where two rubber strings are used, they may be mixedly woven in the texture of the cover material so as to transversely meet each other or be in a parallel relation to each other without any differences in the effects produced.

The invention will now be described in detail with reference to the drawings showing a preferred embodiment of the invention.

BRIEF DESCRIPTION OF THE DRAWINGS

FIG. 1 shows the coated rubber cord in its normal state.

FIG. 2 shows the rubber cord as extended.

DETAILED DESCRIPTION OF THE INVENTION

Figure 1:
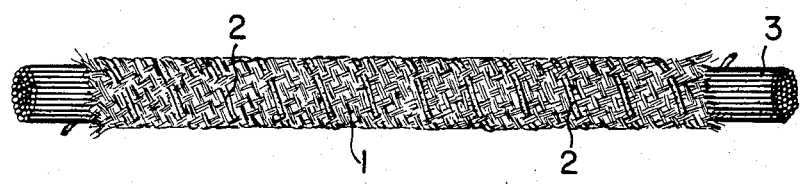
FIGS. 1 and 2 are perspective views showing a part of the coated rubber cord according to the invention with a single rubber string mixedly woven in the texture of the cover material.
Figure 2:
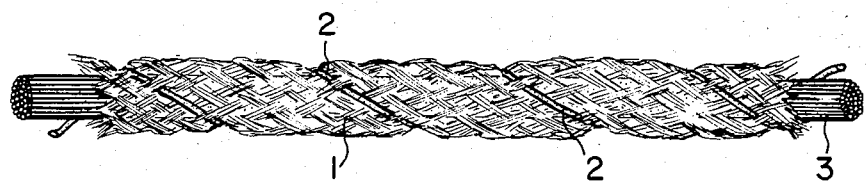
Figure 3:
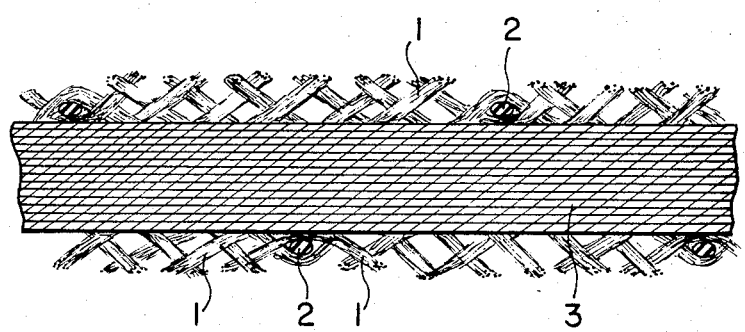
FIG. 3 is a longitudinal section of a part of the coated rubber cord.

The numerals 1, 2, and 3 each designate a cover material, a rubber string woven in the cover material and a core member formed of a bunch of slender rubber lines, respectively. As shown the rubber string 2 is spirally wound round the core member of the rubber cord with substantially a constant pitch. The rubber string 2 is elongated or contracts as the rubber cord is elongated or allowed to contract. The rubber string 2, by elongation, is tightened up to and firmly fastened to the core member 3 so as not to slide over the core member 3 longitudinally or circumferentially. Accordingly no matter how the whole rubber cord may be elongated, allowed to contract or twisted, the rubber string 2 remains wound round the core member at the same location thereon and does not slide over the core member. Further since that rubber string 2 is mixedly woven in the texture of the cover material, the whole cover material also is free from longitudinal or circumferential shifting in relation to the core member. Therefore nonuniformity is not developed in the texture of the woven cover material and the core member of the rubber cord is kept coated with the woven cover material of an even texture throughout. The rubber cord can therefore be elongated or allowed to contract uniformly throughout its length and circumference. Thus while the conventional woven cover material of the rubber cord allows the local fatigue to accumulate in the core member to expedite the breach or snapping of the rubber cords, the cover material according to the invention is totally free from such disadvantage and instead offer only the advantages obtained by the coating of the core member of the rubber cord.

As shown, the rubber string 2 is closely fitted to the core member and submerged in the thickness of the woven cover material so as to be protected by the woven cover material. Further the rubber string 2 naturally need not be extensible at a greater rate than the core member. Therefore the rubber string 2 does not break off earlier than the core member in normal use.

Where an uncovered rubber string is mixedly woven in the cover material, the friction between the rubber string and the core member, which is formed of uncovered rubber lines, is considerably great and may aid in fixing the location of the rubber string in relation to the core member. However, except where, for example, the rubber cord is used for special purposes and subjected to especially great forces, a covered rubber string as mentioned before can sufficiently produce the effects of fixing its location in the texture of the woven cover material and the position of the cover material in relation to the core member of the rubber cord without any inconveniences.

What we claim is:

1. A coated rubber cord comprising a core member which consists of at least one rubber line coated with a woven cover material in the texture of which at least one discrete elongated rubber string is mixedly and spirally woven at substantially a constant pitch whereby to be reduced diametrically on elongation of the rubber cord and to maintain the woven cover material in a fixed position in relation to the core member no matter how the rubber cord may be stretched or allowed to contract so that provision of the woven cover material may not reduce the durability of the coated rubber cord.

2. A coated rubber cord of claim 1, comprising a single rubber string mixedly and spirally woven in the cover material.

3. A coated rubber cord of claim 2, wherein the rubber strings are uncovered rubber strings.

4. A coated rubber cord of claim 2, wherein the rubber string is covered with threads.

5. A coated rubber cord of claim 2, wherein the single rubber string is covered with a fiber.

6. A coated rubber cord of claim 1, comprising a plurality of rubber strings mixedly an spirally woven in the cover material.

7. A coated rubber cord of claim 6, wherein the rubber strings are mixedly woven in the texture of the woven cover material so as to transversely meet each other.

8. A coated rubber cord of claim 6, wherein the rubber strings are mixedly woven in the texture of the woven cover material so as to be in a parallel relation to each other.

9. A coated rubber cord of claim 3, wherein the plurality of rubber strings are uncovered.

10. A coated rubber cord of claim 3, wherein the plurality of rubber strings are covered with threads.

11. A coated rubber cord of claim 6, wherein the plurality of rubber strings are covered with a fiber.

12. A coated rubber cord of claim 1, wherein the core consists of a single rubber line.

13. A coated rubber cord of claim 1, wherein the core member consists of a plurality of rubber lines.

* * * * *